United States Patent
Abe

(10) Patent No.: US 8,508,800 B2
(45) Date of Patent: Aug. 13, 2013

(54) IMAGE FORMING APPARATUS AND METHOD OF COLOR MISREGISTRATION CORRECTION

(75) Inventor: Yasuhiro Abe, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 214 days.

(21) Appl. No.: 13/173,289

(22) Filed: Jun. 30, 2011

(65) Prior Publication Data

US 2012/0008154 A1    Jan. 12, 2012

(30) Foreign Application Priority Data

Jul. 12, 2010  (JP) .................................. 2010-158301

(51) Int. Cl.
*G06F 15/00* (2006.01)

(52) U.S. Cl.
USPC ............. 358/1.9; 358/1.1; 358/1.15; 358/1.8; 358/1.18; 358/1.17; 399/301; 399/49; 399/167; 399/46; 399/396; 399/394; 399/45; 399/117; 399/38; 399/51; 347/116; 347/134; 347/14; 347/19; 345/589

(58) Field of Classification Search
USPC ................. 358/1.9, 1.1, 1.15, 1.8, 1.18, 1.17; 399/301, 49, 394, 45, 51, 39, 46, 167, 117, 399/396, 38; 347/116, 134, 14, 19; 345/589
See application file for complete search history.

(56) References Cited

U.S. PATENT DOCUMENTS

2004/0109708 A1*  6/2004  Kobayashi et al. ........... 399/301

FOREIGN PATENT DOCUMENTS

| JP | 2002-196548 | 7/2002 |
|---|---|---|
| JP | 2009-86527 | 4/2009 |
| JP | 2009-169031 | 7/2009 |

* cited by examiner

*Primary Examiner* — Benny Q Tieu
*Assistant Examiner* — Martin Mushambo
(74) *Attorney, Agent, or Firm* — Oblon, Spivak, McClelland, Maier & Neustadt, L.L.P.

(57) ABSTRACT

A length L of the test pattern string is determined so as to satisfy a condition $L \leq \{P-(Q_1+Q_2)\} \times V$, where a time Q is a total time of a time $Q_1$ for which the test pattern string is transferred from an exposure position of the test pattern string to a sensor and a time $Q_2$ from when the test pattern is detected by the sensor until a color misregistration correction value calculated on the basis of a result of detecting is reflected in image formation; a time P is a time from a timing of starting to write the test pattern string to a timing of starting to write an image in which the correction value should be reflected; and a driving speed of a second image carrier is V.

13 Claims, 9 Drawing Sheets

IMAGE FORMING APPARATUS AND METHOD OF COLOR MISREGISTRATION CORRECTION

CROSS-REFERENCE TO RELATED APPLICATIONS

The present application claims priority to and incorporates by reference the entire contents of Japanese Patent Application No. 2010-158301 filed in Japan on Jul. 12, 2010.

BACKGROUND OF THE INVENTION

1. Field of the Invention

The present invention relates to an image forming apparatus and a method of controlling an image forming apparatus.

2. Description of the Related Art

Heretofore, an image forming apparatus is known in which forming an electrostatic latent image on a photosensitive element by optical writing and primarily transferring a toner image obtained by developing the electrostatic latent image to an intermediate transfer material such as an intermediate transfer belt are carried out for each color so that the toner images of the respective colors overlap each other on the intermediate transfer material, and then the toner images of the respective colors on the intermediate transfer material are transferred and fixed to a sheet to obtain a color image.

In this image forming apparatus, in carrying out image adjustment, such as color misregistration correction or density correction, on an image to be formed, in general, a test pattern is formed on the intermediate transfer belt and detected by a sensor. Meanwhile, at the time of the image adjustment, since normal image formation is not carried out on a sheet, if the image adjustment is frequently carried out, a downtime for which image formation on a sheet is interrupted increases, and efficient image formation may not be carried out.

In order to reduce the downtime, Japanese Patent Application Laid-open No. 2009-169031 describes a method in which a test pattern is formed in regions that are other than the image region on the intermediate transfer belt and are located at both sides of the image region to sandwich the image region, and image adjustment is carried out on the basis of a result of detecting the test pattern by a sensor. According to this method, it is possible to reduce the downtime of the apparatus by process control for image formation using a test pattern and to obtain stable image quality.

In Japanese Patent Application Laid-open No. 2009-169031, an elapsed time in which the test pattern is conveyed to a position of the sensor, the test pattern is detected by the sensor and an adjustment value is calculated on the basis of a result of detecting is not taken into consideration. For this reason, in order to reflect the adjustment value obtained by detecting the test pattern in a target image, a wasteful waiting time occurs.

SUMMARY OF THE INVENTION

It is an object of the present invention to at least partially solve the problems in the conventional technology.

According to an aspect of the present invention, there is provided an image forming apparatus including: a plurality of first image carriers; a toner image forming unit which exposes the plurality of first image carriers to form latent images and develops the latent images on the plurality of first image carriers with toner of different colors to form images of the respective colors; a second image carrier which is driven at a predetermined speed and to which the image of each of the colors formed on one of the plurality of first image carriers by the toner image forming unit is transferred in an aligned and overlapped manner; an image forming unit which transfers the images of the respective colors, which has been transferred on the second image carrier in an overlap manner, to a transfer material to carry out image formation; a test pattern generation unit which generates a test pattern string which includes one or a plurality of test pattern images and which is formed by the plurality of first image carriers and transferred to the second image carrier; a detection unit which detects the test pattern string transferred to the second image carrier by a sensor; and a correction value calculation unit which calculates a correction value used to correct an image formation condition in the toner image forming unit on the basis of a result of detecting the test pattern string by the detection unit. The test pattern generation unit generates the test pattern string such that a first length of the test pattern string in a sub scanning direction is equal to or smaller than a second length which is obtained by multiplying the speed, at which the second image carrier is driven, by a time obtained by subtracting a total time of a time for which the test pattern string is conveyed from a position, at which the plurality of first image carriers is exposed, to the sensor by the second image carrier and a time from when the test pattern string is detected by the detection unit until the correction value calculated by the correction value calculation unit is reflected in the image formation by the toner image forming unit from a time from a timing of starting to write the test pattern string to the first image carriers to a timing of starting to write an image in which the correction value should be reflected.

According to another aspect of the present invention, there is provided A method of controlling an image forming apparatus. The method includes: a toner image forming step in which an image forming unit exposes a plurality of first image carriers to form latent images and develops the latent images on the plurality of first image carriers with toner of different colors to form images of the respective colors; an image forming step in which an image forming unit transfers the images of the respective colors transferred to a second image carrier, which is driven at a predetermined speed and to which the images of the respective colors formed on the plurality of first image carriers are transferred in an aligned and overlapped manner in the toner image forming step, in an overlapped manner to a transfer material to carry out image formation; a test pattern generation step in which a test pattern generation unit generates a test pattern string including one or a plurality of test pattern images, which is formed by the plurality of first image carriers and transferred to the second image carrier; a detection step in which a detection unit detects the test pattern string transferred to the second image carrier by a sensor; and a correction value calculation step in which a correction value calculation unit calculates a correction value used to correct an image forming condition in the toner image forming step on the basis of a result of detecting the test pattern string in the detection step. In the test pattern generating step, the test pattern string is generated such that a first length of the test pattern string in a sub scanning direction is equal to or smaller than a second length which is obtained by multiplying the speed, at which the second image carrier is driven, by a time obtained by subtracting a total time of a time for which the test pattern string is conveyed from a position, at which the plurality of first image carriers is exposed, to the sensor by the second image carrier and a time from when the test pattern string is detected in the detection step until the correction value calculated in the correction value calculation step is reflected in the image formation in the toner image forming step from a time from a timing of starting to write the test pattern string to the first image carriers to a timing of starting to write an image in which the correction value should be reflected.

According to still another aspect of the present invention, there is provided an image forming apparatus including: a plurality of first means for carrying an image; a means for forming a toner image which exposes the plurality of first means for carrying the image to form latent images and develops the latent images on the plurality of first means for carrying the image with toner of different colors to form images of the respective colors; a second means for carrying the image an image which is driven at a predetermined speed and to which the image of each of the colors formed on one of the plurality of first means for carrying the image by the toner image forming unit is transferred in an aligned and overlapped manner; a means for forming an image which transfers the images of the respective colors, which has been transferred on the second means for carrying the image in an overlap manner, to a transfer material to carry out image formation; a means for generating a test pattern string which includes one or a plurality of test pattern images and which is formed by the plurality of first means for carrying the image and transferred to the second means for carrying the image; a means for detecting the test pattern string transferred to the second means for carrying the image by a sensor; and a means for calculating a correction value used to correct an image formation condition in the means for forming the toner image on the basis of a result of detecting the test pattern string by the means for detecting. The means for generating the test pattern generates the test pattern string such that a first length of the test pattern string in a sub scanning direction is equal to or smaller than a second length which is obtained by multiplying the speed, at which the second image carrier is driven, by a time obtained by subtracting a total time of a time for which the test pattern string is conveyed from a position, at which the plurality of first image carriers is exposed, to the sensor by the second image carrier and a time from when the test pattern string is detected by the detection unit until the correction value calculated by the correction value calculation unit is reflected in the image formation by the toner image forming unit from a time from a timing of starting to write the test pattern string to the first image carriers to a timing of starting to write an image in which the correction value should be reflected.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
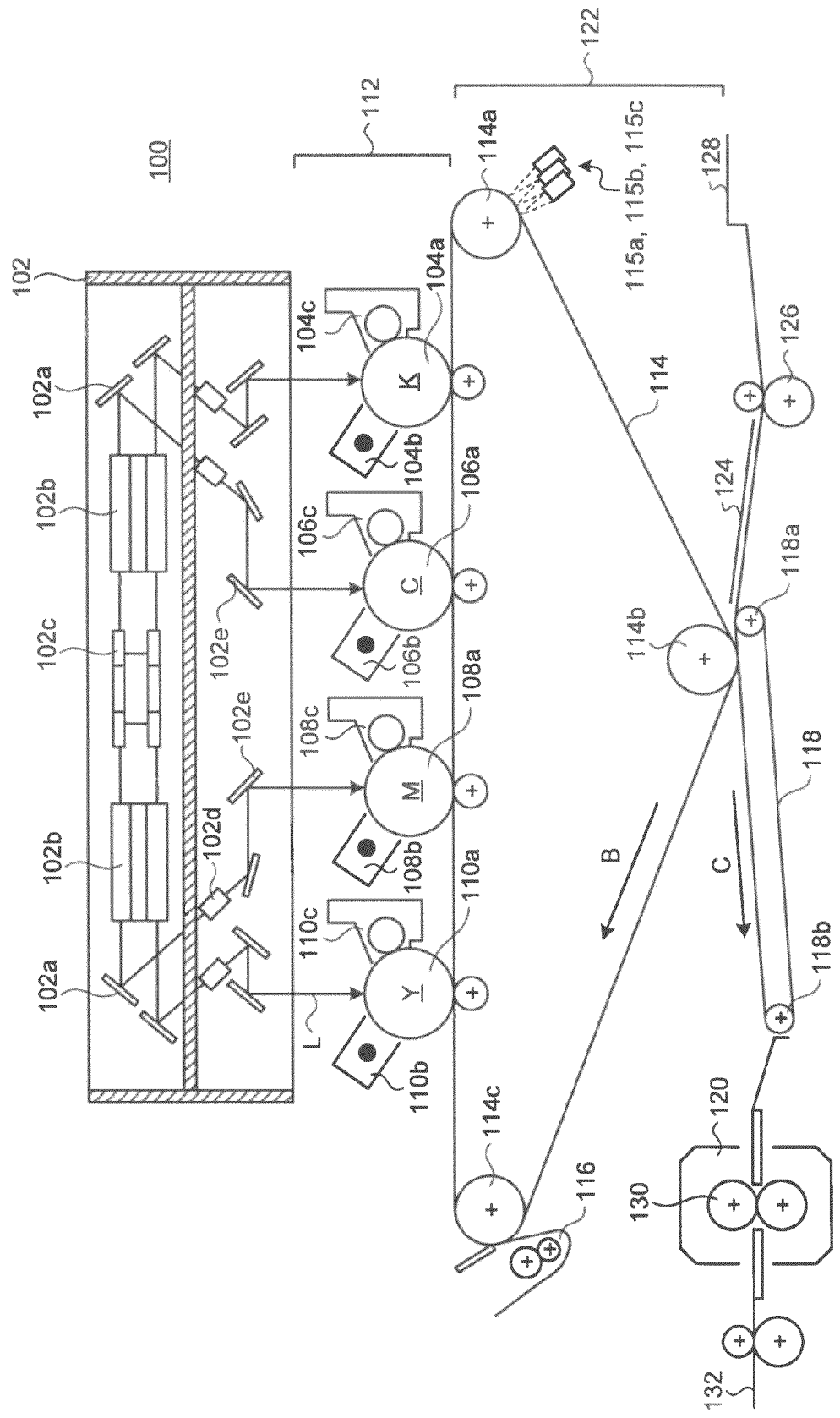
FIG. 1 is a schematic view showing an example of the structure of an image forming apparatus which can be applied to an embodiment of the invention.

An embodiment of an image forming apparatus according to the invention will be described in detail with reference to the accompanying drawings. FIG. 1 shows an example of the structure of an image forming apparatus 100 which can be applied to the embodiment of the invention. The image forming apparatus 100 includes an optical unit 102 which includes optical elements, such as a semiconductor laser and a polygon mirror, an image forming unit 112 which includes a photosensitive element, a charging unit, a developing unit, and the like, and a transfer unit 122 which includes an intermediate transfer belt and the like.

The optical unit 102 deflects light beams emitted from a laser light source (not shown), such as a semiconductor laser, by a polygon mirror 102c and inputs the light beams to fθ lenses 102b. In the example of FIG. 1, light beams are emitted such that a number of light beams corresponds to a number of colors of yellow (Y), magenta (M), cyan (C), and black (K). The light beams of the respective colors pass through the fθ lens 102b, are reflected by reflecting mirrors 102a, and are input to WTL lenses 102d.

The WTL lenses 102d shape the light beams and deflect the light beams to reflecting mirrors 102e, and the light beams are irradiated onto photosensitive elements 104a, 106a, 108a, and 110a in an imagewise manner as light beams L which are used for exposure. As described above, the irradiation of the light beams L onto the photosensitive elements 104a, 106a, 108a, and 110a is carried out using a plurality of optical elements, such that timing synchronization is made with respect to a main scanning direction which is the scanning direction of the light beams L and a sub scanning direction perpendicular to the main scanning direction. In general, the sub scanning direction is defined as the rotation direction of the photosensitive elements 104a, 106a, 108a, and 110a.

The photosensitive elements 104a, 106a, 108a, and 110a respectively include a photoconductive layer having at least a charge generation layer and a charge transport layer on a conductive drum made of aluminum, etc. The photoconductive layer is given surface charge by chargers 104b, 106b, 108b, and 110b which are provided to correspond to the photosensitive elements 104a, 106a, 108a, and 110a, respectively, and include a corotron, a scorotron, a charging roller, and the like.

Electrostatic charges on the photosensitive elements 104a, 106a, 108a, and 110a given by the chargers 104b, 106b, 108b, and 110b are exposed to the light beams in an imagewise manner, and electrostatic latent images are formed. The electrostatic latent images formed on the photosensitive elements 104a, 106a, 108a, and 110a are respectively developed by developing units 104c, 106c, 108c, and 110c which include a developing sleeve, a developer supply roller, a regulating blade, and the like, and developer images are formed.

The developer carried on the photosensitive elements 104a, 106a, 108a, and 110a is transferred to an intermediate transfer belt 114 which is driven in the direction of an arrow B by conveying rollers 114a, 114b, and 114c. The intermediate transfer belt 114 is driven to a secondary transfer unit in a state where the developers of the respective colors of C, M, Y, and K are carried thereon. The secondary transfer unit includes a secondary transfer belt 118 and conveying rollers 118a and 118b. The secondary transfer belt 118 is driven in the direction of an arrow C by the conveying rollers 118a and 118b. An image receiving material 124, such as high-quality paper or plastic sheet, is fed from an image receiving material accommodating unit 128, such as a sheet cassette, to the secondary transfer unit by a conveying roller 126.

The secondary transfer unit applies a secondary transfer bias to transfer multicolor developer image carried on the intermediate transfer belt 114 to the image receiving material 124 absorbed and held onto the secondary transfer belt 118. The image receiving material 124 is fed to a fixing unit 120 as the secondary transfer belt 118 is conveyed. The fixing unit 120 includes a fixing member 130, such as a fixing roller containing silicon rubber, fluorine rubber, or the like, presses and heats the image receiving material 124 and the multicolor developers, and outputs the image receiving material 124 as a printed matter 132 outside the image forming apparatus 100. From the intermediate transfer belt 114 from which the multicolor developers are transferred, a transfer residual developer is removed by a cleaning unit 116 including a cleaning blade. Then, the intermediate transfer belt 114 is forwarded to the next image forming process.

The image forming apparatus 100 of this embodiment forms the test pattern for color misregistration correction on the intermediate transfer belt 114 for the purpose of image quality adjustment. Downstream of the photosensitive elements 104a, 106a, 108a, and 110a in a driving direction of the intermediate transfer belt 114, sensors 115a, 115b, and 115c are provided to detect the test pattern for color misregistration correction formed on the intermediate transfer belt 114. The sensors 115a, 115b, and 115c are arranged as close as possible to the photosensitive element 104a located most downstream in the driving direction of the intermediate transfer belt 114 so as to more rapidly detect the test pattern for color misregistration correction.

Figure 2:
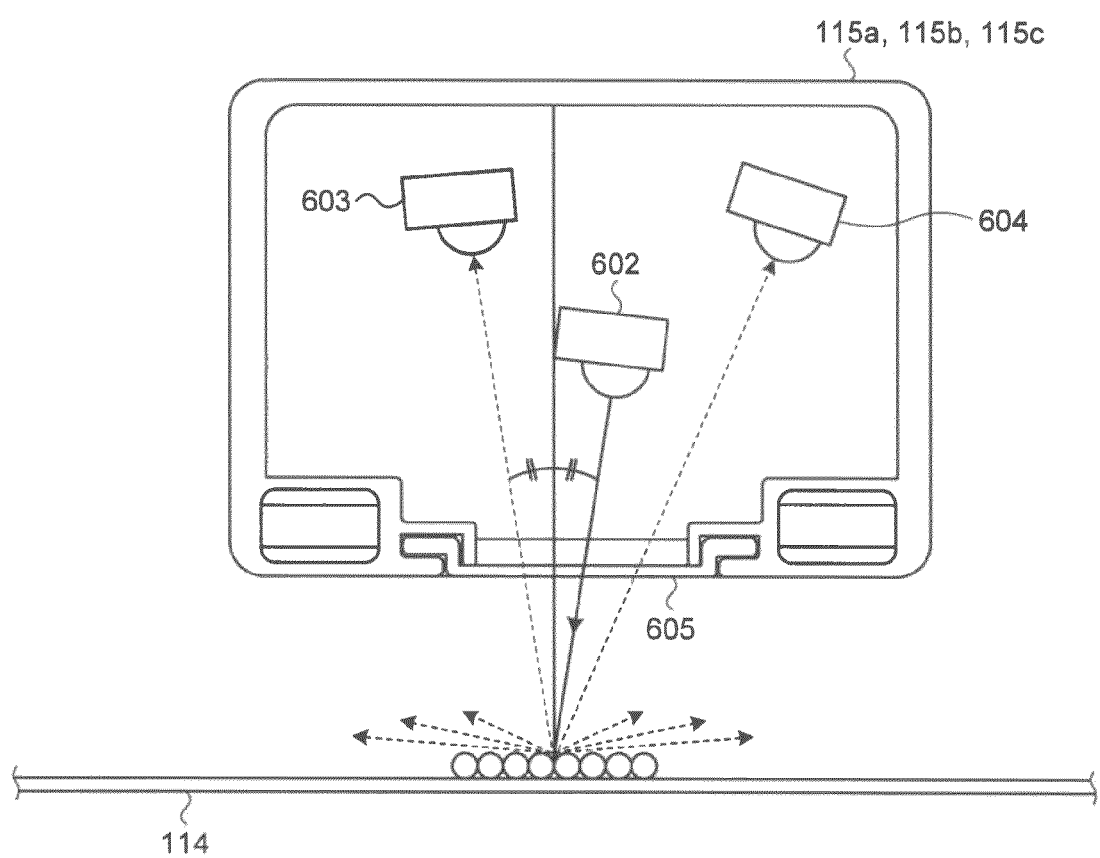
FIG. 2 is a schematic view showing an example of structure of a sensor.

FIG. 2 shows an example of a structure of the sensors 115a, 115b, and 115c. The same configuration can be applied to the sensors 115a, 115b, and 115c, and the sensors 115a, 115b, and 115c are hereinafter referred to as a sensor 115 unless there is need to particularly distinguish these.

In FIG. 2, the sensor 115 has one light-emitting element 602 and two light-receiving elements 603 and 604. The light-emitting element 602 is, for example, an infrared LED (Light Emitting Diode), and irradiates the intermediate transfer belt 114 with the emitted infrared light. A laser light-emitting element may be used as the light-emitting element 602. The light-receiving elements 603 and 604 are, for example, phototransistors. Photodiodes may be used as the light-receiving elements 603 and 604 by amplifying output thereof.

In this example, the light-receiving element 603 is provided at a position at which the light-receiving element 603 receives normally reflected light generated from infrared light being emitted from the light-emitting element 602 and then being specularly reflected by the intermediate transfer belt 114, and the light-receiving element 604 is provided at a position at which the light-receiving element 604 does not receive the normally reflected light. That is, the light-receiving element 604 receives diffusely reflected light generated from infrared light being emitted from the light-emitting element 602 and then being diffusely reflected by the intermediate transfer belt 114. A condensing lens 605 is provided in the optical path of the infrared light from the light-emitting element 602 and normally reflected light and diffusely reflected light of the infrared light from the intermediate transfer belt 114.

Although, in FIG. 2, the light-receiving element 603 which receives the normally reflected light and the light-receiving element 604 which receives the diffusely reflected light are provided separately, the invention is not limited thereto, and only one of the light-receiving elements 603 and 604 may be provided depending on a detection target or necessary information.

Figure 3:
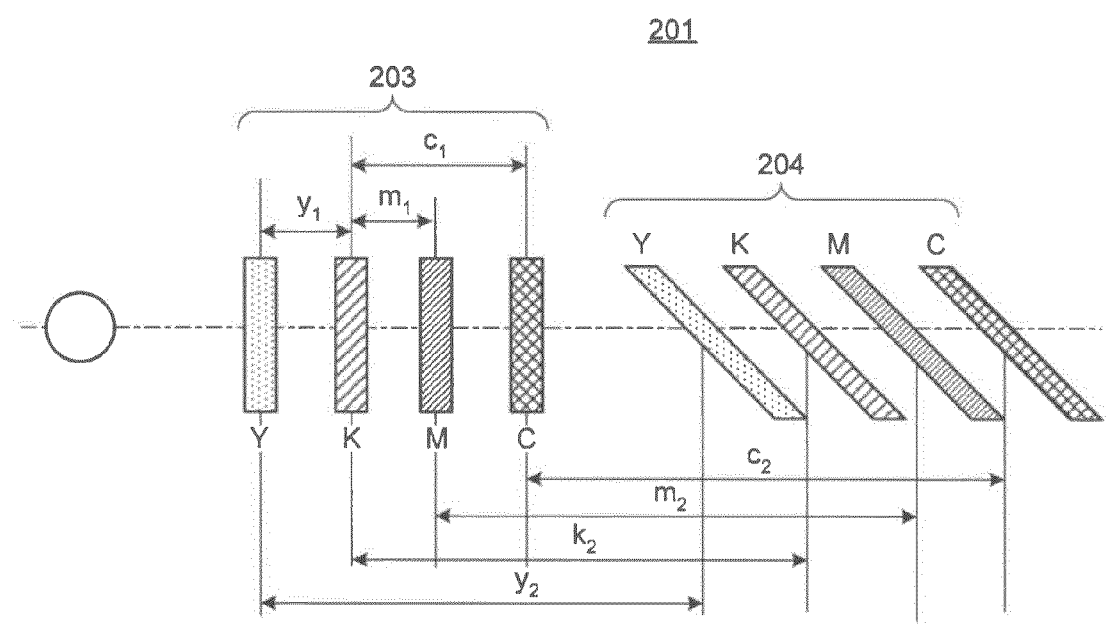
FIG. 3 is a schematic view showing an example of a test pattern for color misregistration correction which can be applied to an embodiment of the invention.

FIG. 3 shows an example of a test pattern 201 for color misregistration correction which can be applied to this embodiment. The test pattern 201 for color misregistration correction is constituted by a transverse line pattern 203 and an inclined line pattern 204. The transverse line pattern 203 has lines of the respective colors that are parallel with the main scanning direction and arranged at regular intervals. The inclined line pattern 204 has lines of the respective colors that are inclined at an angle of 45° with respect to the main scanning direction and are arranged at regular intervals. In the example of FIG. 3, in each of the transverse line pattern 203 and the inclined line pattern 204, the lines of the respective colors are arranged in order of Y, K, M, and C. Hereinafter, the test pattern 201 for color misregistration correction is simply referred to as a test pattern 201 unless there is need to particularly describe.

Figure 4:
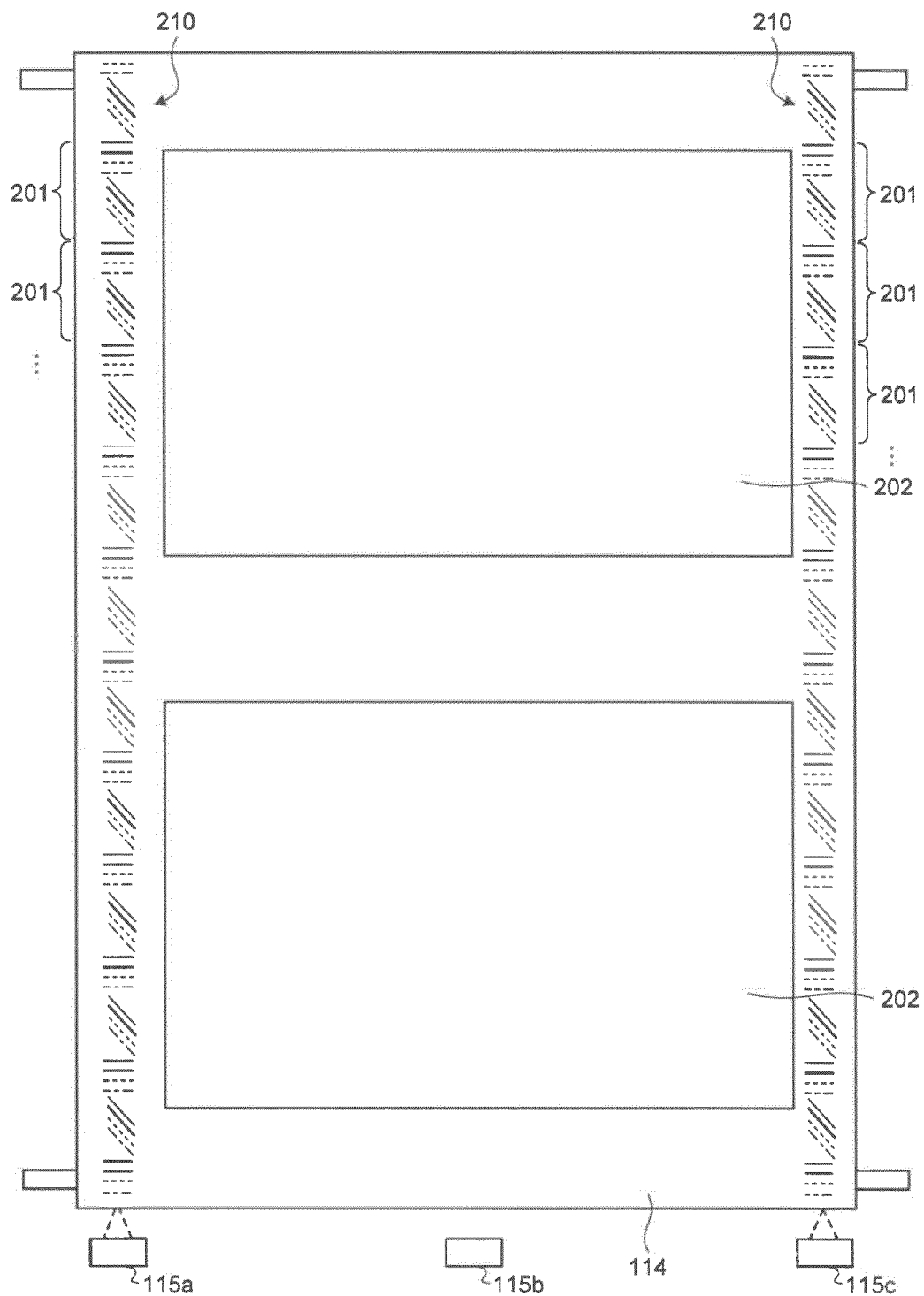
FIG. 4 is a schematic view showing an example of an arrangement of the test pattern for color misregistration correction which can be applied to an embodiment of the invention.

As illustrated in FIG. 4, the test pattern 201 is repeatedly formed on the intermediate transfer belt 114 at both sides of an image 202 formed by a multicolor developer to be transferred to a sheet, and test pattern strings 210 are formed at both sides of the image 202. A length from the line at a head of one of the test patterns 201 (the line of the color Y of the transverse line pattern 203) to the line at the head of another of the test patterns 201 arranged next to the one of the test patterns 201 is defined as a length of the test pattern 201. The test patterns 201 included in the test pattern strings 210 arranged at both sides of the image 202 are respectively detected by the sensor 115a and the sensor 115c, and color misregistration correction processing is performed.

In the test pattern 201, for example, results of detecting the lines constituting the transverse line pattern 203 and the inclined line pattern 204 by the sensor 115a and the sensor 115c are sampled at certain sampling intervals, and time intervals at which the lines of the transverse line pattern 203 and the inclined line pattern 204 are detected are measured. The measured time interval is multiplied by known speed of the intermediate transfer belt 114, thereby making it possible to obtain the distance between the lines constituting the transverse line pattern 203 and the inclined line pattern 204. The distances between the lines of the same color of the transverse line pattern 203 and the inclined line pattern 204 are measured and the distances in the respective colors are compared with each other, making it possible to obtain misregistration amounts.

The color misregistration detection will be more specifically described with reference to FIG. 3. To calculate a color misregistration in the sub scanning direction, the transverse line pattern 203 is used, and pattern intervals ($y_1$, $m_1$, $c_1$) between the line of the color K as a reference color and the lines of other colors Y, M, and C are measured. By comparison of measurement results with ideal distances between the lines of the respective colors and the line of the reference color, it is possible to calculate the color misregistration in the sub scanning direction.

To calculate a color misregistration in the main scanning direction, for each of the colors, an interval ($y_2$, $k_2$, $m_2$, $c_2$) between the line of the transverse line pattern 203 and the line of the inclined line pattern 204 is measured. Since the lines of the inclined line pattern 204 have an angle of 45° with respect to the main scanning direction, a differences in the measured time interval between the reference color (color K) and other colors Y, M, and C correspond to color misregistration amounts in the main scanning direction in the respective colors Y, M, and C. For example, the color misregistration amount in the main scanning direction in the color Y is calculated as $k_2 - y_2$. In this way, it is possible to obtain the color misregistration (registration shift) amount in the sub scanning direction and the main scanning direction using the test pattern 201.

The color misregistration amount detection processing can be performed by using at least one test pattern 201. The color misregistration amounts in the respective colors may be detected using a plurality of the test patterns 201, thereby making it possible to perform the color misregistration correction processing with better precision. For example, a case is conceivable where statistical processing, such as average value processing, is performed on the color misregistration amounts calculated using the plurality of test patterns 201 so that the color misregistration amounts in respective colors are calculated.

Further, the above-described color misregistration amount detection processes may be respectively performed using the sensors 115a, 115b, and 115c located at different positions in the main scanning direction, thereby making it possible to detect distributions of the various misregistration amounts in the main scanning direction and the sub scanning direction. For example, a skew component can be obtained by calculating a difference between the color misregistration amounts in the sub scanning direction detected by the sensor 115a and the sensor 115c. A pattern adapted to the sensor 115b may be further formed, so that a magnification error deviation can be obtained by calculating a difference between the misregistration amounts in the main scanning direction detected by the sensors 115a and 115b and a difference between misregistration amounts in the main scanning direction detected by the sensors 115b and 115c.

With regard to a test pattern for adjustment of image quality or the like at the time of printing, there are various types of test patterns other than the test pattern 201 for color misregistration correction. In this case, when carrying out color misregistration correction, only the test pattern 201 for color misregistration correction may be formed, thereby making it possible to save toner by an amount which is consumed if another test pattern which is used for image quality adjustment is formed.

Figure 5:
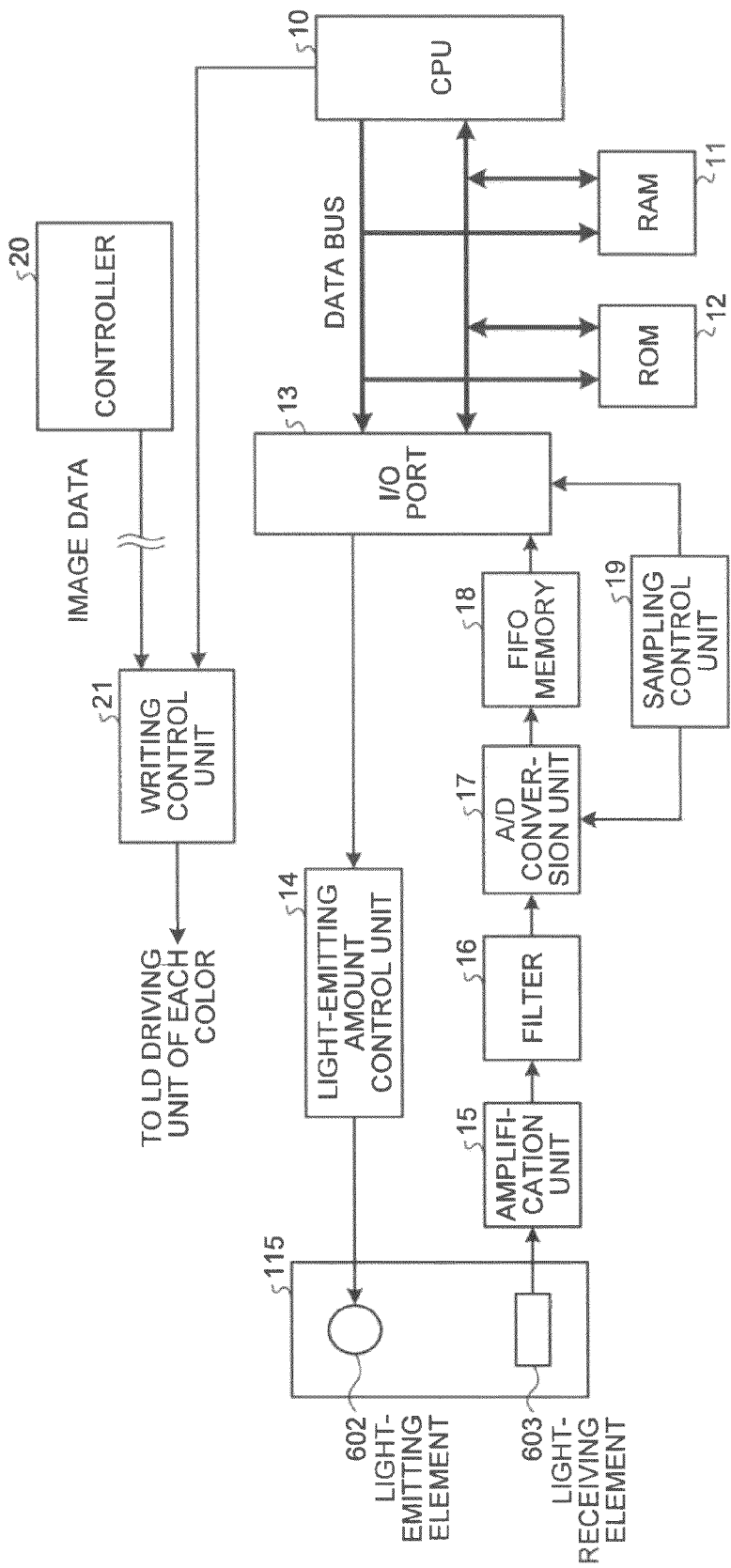
FIG. 5 is a block diagram showing an example of a configuration of a signal processing system in the image forming apparatus which can be applied to an embodiment of the invention.

FIG. 5 shows an example of the configuration of a signal processing system in the image forming apparatus 100 which can be applied to this embodiment. Description will be provided focusing on a configuration for color misregistration detection, which closely relates to this embodiment, in the signal processing system of the image forming apparatus 100. It is assumed that the test pattern 201 is detected by the light-receiving element 603, which receives normally reflected light, among the two light-receiving elements 603 and 604 included in the sensor 115.

A CPU (Central Processing Unit) 10 performs predetermined arithmetic processing in accordance with a program stored in advance in a ROM (Read Only Memory) 12 using a RAM (Random Access Memory) 11 as a work memory, and controls pattern detection processing in this embodiment. The CPU 10 is connected to an I/O port 13 through a data bus. The I/O port 13 controls reading of data from a FIFO memory 18, data transfer through the data bus, etc. described later.

In the sensor 115, if reflected light of infrared light emitted from the light-emitting element 602 is received by the light-receiving element 603, the light-receiving element 603 outputs an analog detection signal depending on the intensity of the received infrared light. The analog detection signal is amplified by an amplification unit 15, is processed by a filter 16 such that a signal component corresponding to line detection is selectively passed through the filter 16, and is supplied to an A/D conversion unit 17 so as to be converted to digital detection data. Sampling of detection data converted by the A/D conversion unit 17 is controlled by a sampling control unit 19. Detection data sampled by the A/D conversion unit 17 is stored in the FIFO (First In First Out) memory 18.

In the sampling control unit 19, if the detection of one of the test patterns 201 ends, detection data of the one of the test patterns 201 stored in the FIFO memory 18 is output from the FIFO memory 18. The detection data output from the FIFO memory 18 is supplied to the CPU 10 and the RAM 11 through the I/O port 13. The CPU 10 calculates various misregistration amounts, such as the above-described color misregistration amount, in accordance with a program stored in the ROM 12.

The CPU 10 evaluates a color misregistration correction value for correcting the color misregistration amount calculated from a result of detecting the test pattern 201. The CPU 10 performs settings for a writing control unit 21 to cause change in a timing of starting writing operation or a frequency of pixel clock, etc. so as to achieve correction corresponding to the evaluated color misregistration correction value.

The writing control unit 21 has a configuration such as a clock generator utilizing a VCO (Voltage Controlled Oscillator), which is capable of finely setting a frequency of an output, and uses the output as a pixel clock. The writing control unit 21 controls lighting of a laser light source (not shown) based on the pixel clock and in accordance with image data transmitted from a controller 20, and carries out image writing to the photosensitive elements 104a, 106a, 108a, and 110a.

The writing control unit 21 carries out image writing to the photosensitive elements 104a, 106a, 108a, and 110a at the writing timing and based on the pixel clock frequency set by the CPU 10 on the basis of the color misregistration correction value, thereby achieving image formation in which formed image is corrected by the color misregistration correction value.

The CPU 10 monitors detection data from the light-receiving element 603 at an appropriate timing, generates a control signal for controlling a level of the infrared light emitted from the light-emitting element 602 on the basis of a result of monitoring the detection data, and supplies the control signal to a light-emitting amount control unit 14 through the I/O port 13. The light-emitting amount control unit 14 controls the light-emitting amount of the light-emitting element 602 in accordance with the control signal. Thus, it is possible to make the level of the infrared light emitted from the light-emitting element 602 substantially constant, and even when deterioration of the intermediate transfer belt 114 or a laser light source (not shown) occurs, it becomes possible to reliably detect the test pattern 201.

Figure 6:
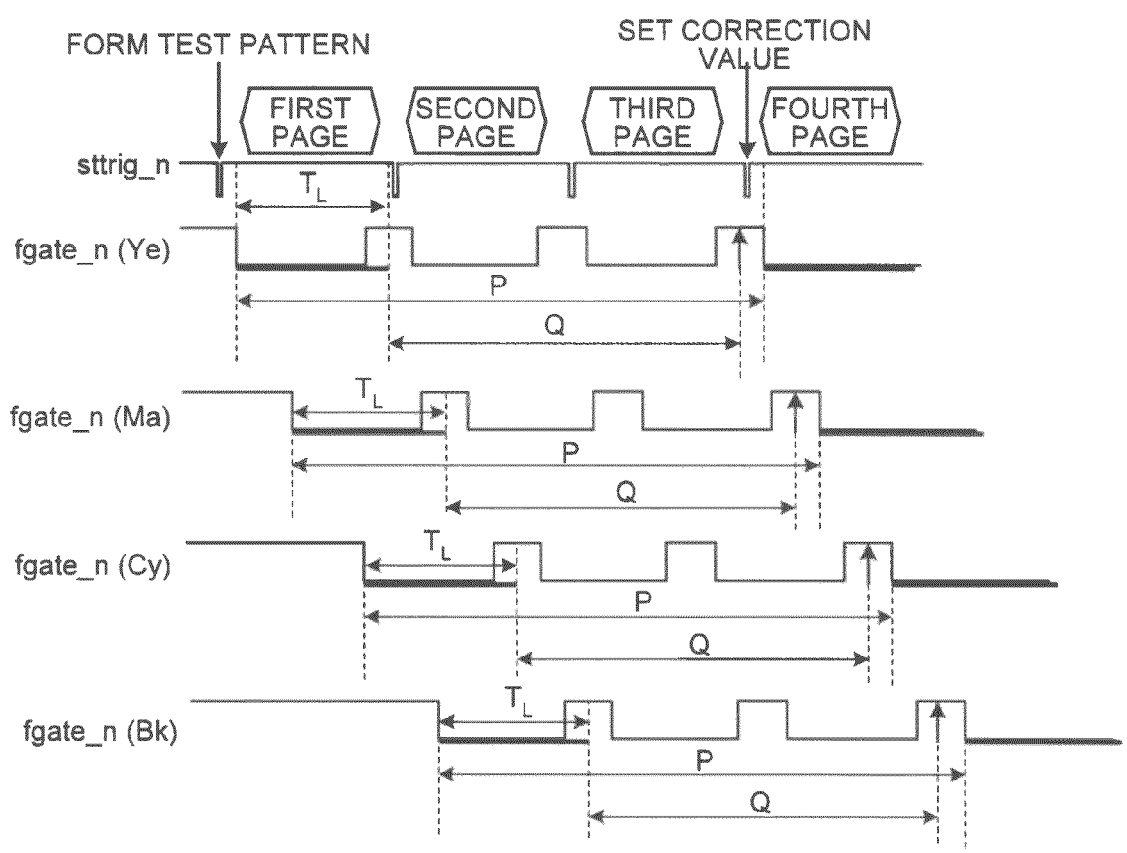
FIG. 6 is an example of a timing chart when image formation and test pattern formation are carried out in parallel.

Next, the color misregistration correction processing of this embodiment will be more specifically described. FIG. 6 is an example of a timing chart when image formation and formation of the test pattern 201 are carried out in parallel in the configuration of FIG. 1. FIG. 6 shows an example where the test pattern string 210 is formed in parallel with image formation of a first page of a print job, and a correction value based on the test pattern string 210 is reflected in an image of a fourth page.

In FIG. 6, a signal sttrig_n denotes the start timing for each page of the print job. A signal fgate_n(Color) denotes the writing period of the image region, that is, image data of each color of Ye, Ma, Cy, and Bk. During a period in which the signal fgate_n(Color) is at a low level, writing of image data is carried out. A period of a high level between periods of the low level corresponds to a non-image area where writing of image data is not performed, and is called an inter-sheet area.

The positions of the photosensitive elements 104a, 106a, 108a, and 110a of the respective colors are different from each other. For this reason, in order to form the images of the respective colors in one page on the intermediate transfer belt 114 at the same position in an overlapped manner, it is necessary to make timings of stating writing different from each other depending on the positions of the photosensitive elements 104a, 106a, 108a, and 110a. Thus, as illustrated in FIG. 6, the periods at which the signals fgate_n of respective colors are temporally shifted from each other depending on the positions of the photosensitive elements 104a, 106a, 108a, and 110a of the respective colors.

In the example of FIG. 1, the photosensitive elements 104a, 106a, 108a, and 110a are arranged in order of the photosensitive element 110a of the color Ye, the photosensitive element 108a of the color Ma, the photosensitive element 106a of the color Cy, and the photosensitive element 104a of the color Bk in the driving direction of the intermediate transfer belt 114. A developer image on the photosensitive element 110a of the color Ye is first transferred to the intermediate transfer belt 114. Thus, with regard to the signal fgate_n, the signal fgate_n(Ye) for the color Ye is first switched to the low level, and the signals fgate_n of the subsequent colors are sequentially switched to the low level at timings that are delayed by time differences depending on a driving speed of the intermediate transfer belt 114 and distances to the photosensitive elements 104a, 106a, and 108a.

In FIG. 6, a time $T_L$ represents a time for which the test pattern string 210 used to correct an image of a correction-target page is formed. For example, the test pattern string 210 is formed such that a head thereof is aligned with a head of the image of the page in the sub scanning direction. It is possible to determine the length L of the test pattern string 210 in the sub scanning direction by multiplying the time $T_L$ by the driving speed of the intermediate transfer belt 114. A time P represents a time from the timing of starting to write the image of the page at which the test pattern string 210 is formed to the timing of starting to write the image in which the correction value determined using the test pattern string 210 is reflected.

A time Q represents a total time of a time $Q_1$ for which the test pattern string 210 is conveyed from a position at which exposure for the test pattern string 210 is performed to a position at the sensor 115 and a time $Q_2$ from when the test pattern string 210 is detected by the sensor 115 until the color misregistration correction value calculated on the basis of a result of detecting the test pattern string 210 is reflected in image formation by performing corresponding setting of the system (the writing control unit 21). The conveying time $Q_1$ is measured from a timing, at which the formation of the test pattern string 210 ends. The color misregistration correction value is reflected in the image formation at a timing corresponding to the inter-sheet area. This is because, if the color misregistration correction value is reflected in the middle of a period corresponding to the image region, image quality changes in the middle of the image in the image area and a boundary appears in that portion, causing deterioration in image quality.

In this embodiment, a relationship between the length L of the test pattern string 210, the time P, and the time $Q_1$ and $Q_2$ is defined to satisfy a condition of the following expression (1). In the expression (1), a speed V denotes the driving speed of the intermediate transfer belt 114.

$$L \leq \{P-(Q_1+Q_2)\} \times V \qquad (1)$$

In the expression (1), when the length L causes a remainder with respect to a length of the test pattern 201, that is, when the length L is not an integer multiple of the length of the test pattern 201, the length L of the test pattern string 210 is rounded up to an integer multiple of the length of the test pattern 201. It should suffice that the length of the test pattern string 210 actually formed is larger than the length of the test pattern string 210 which is used to calculate the color misregistration correction value. It is not necessary that the length of the test pattern string 210 actually formed coincides with the length of the test pattern string 210 which is used to calculate the color misregistration correction value.

The time $Q_1$ and the time $Q_2$ are fixed values which are determined from a structure or specifications of the image forming apparatus 100. Thus, when the speed V is known, the expression (1) shows that the maximum value of the length L of the test pattern string 210 is determined by a number of pages from the page at which the test pattern string 210 starts to be formed to the page in which the correction value determined using the test pattern string 210 is reflected.

That is, when the page in which the correction value should be reflected is determined in advance, it can be ensured that the correction value determined using the test pattern string 210 in the relevant page is reflected by setting the length L of the test pattern string 210 to satisfy the expression (1) and calculating the correction value. Thus, it is possible to prevent occurrence of a problem in that the correction value determined using the test pattern string 210 cannot be reflected in the page at which the correction value should be reflected, and the correction value is reflected in, for example, a page next to the page at which the correction value should be reflected. Further, it is possible to prevent the occurrence of a wasteful waiting time until the correction value is reflected.

The photosensitive elements 104a, 106a, 108a, and 110a of the respective colors are at different positions, and the sensor 115 is at the same position regardless of the colors. For this reason, the time $Q_1$ has a different value for each color. In general, a exposure position of each of the photosensitive elements 104a, 106a, 108a, and 110a at which corresponding one of the photosensitive elements 104a, 106a, 108a, and 110a is exposed is different from a transfer position where the developer image on the corresponding one of the photosensitive elements 104a, 106a, 108a, and 110a is transferred to the intermediate transfer belt 114. Thus, the time $Q_1$ includes a time for which the exposure position of the photosensitive element moves to the transfer position.

Figure 7:
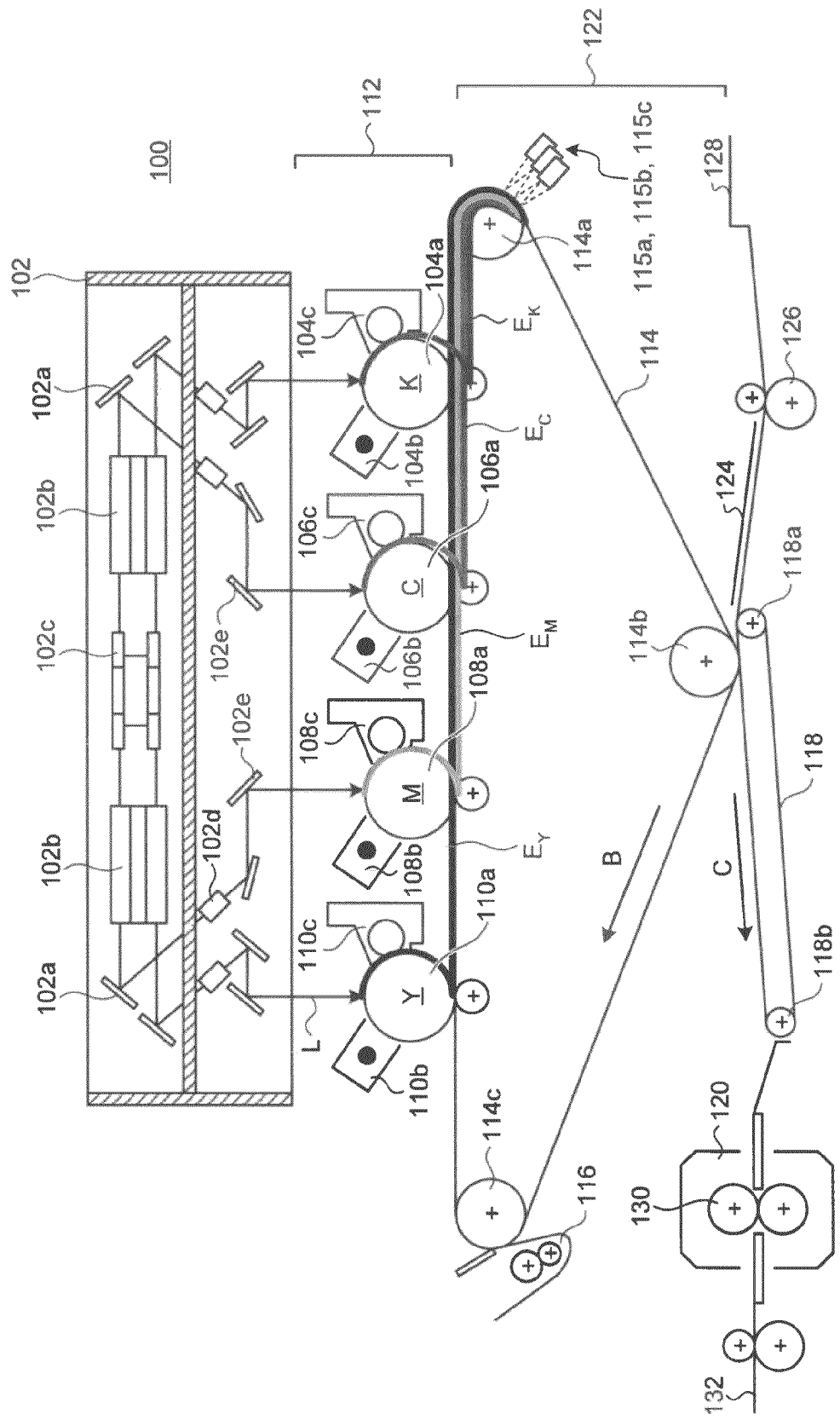
FIG. 7 is a schematic view illustrating an example of a relationship between an exposure position of each color and a position of a sensor.

That is, as illustrated in FIG. 7, with regard to the color Ye, the photosensitive element 110a is arranged on the most anterior side in the driving direction of the intermediate transfer belt 114, and the distance from the exposure position to the sensor 115 is a distance $E_Y$. With regard to the color Ma, the corresponding photosensitive element 108a is closer to the sensor 115 than the photosensitive element 110a is, and a distance from the exposure position to the sensor 115 is a distance $E_M$ that is smaller than the distance $E_Y$. With regard to the color Cy, the corresponding photosensitive element 106a is closer to the sensor 115 than the photosensitive element 108a is, and a distance from the exposure position to the sensor 115 is a distance $E_C$ that is smaller than the distance $E_M$. Similarly, with regard to the color Bk, the corresponding photosensitive element 104a is closer to the sensor 115 than the photosensitive element 106a is, and a distance from the exposure position to the sensor 115 is a distance $E_K$ that is smaller than the distance $E_C$.

Figure 8:
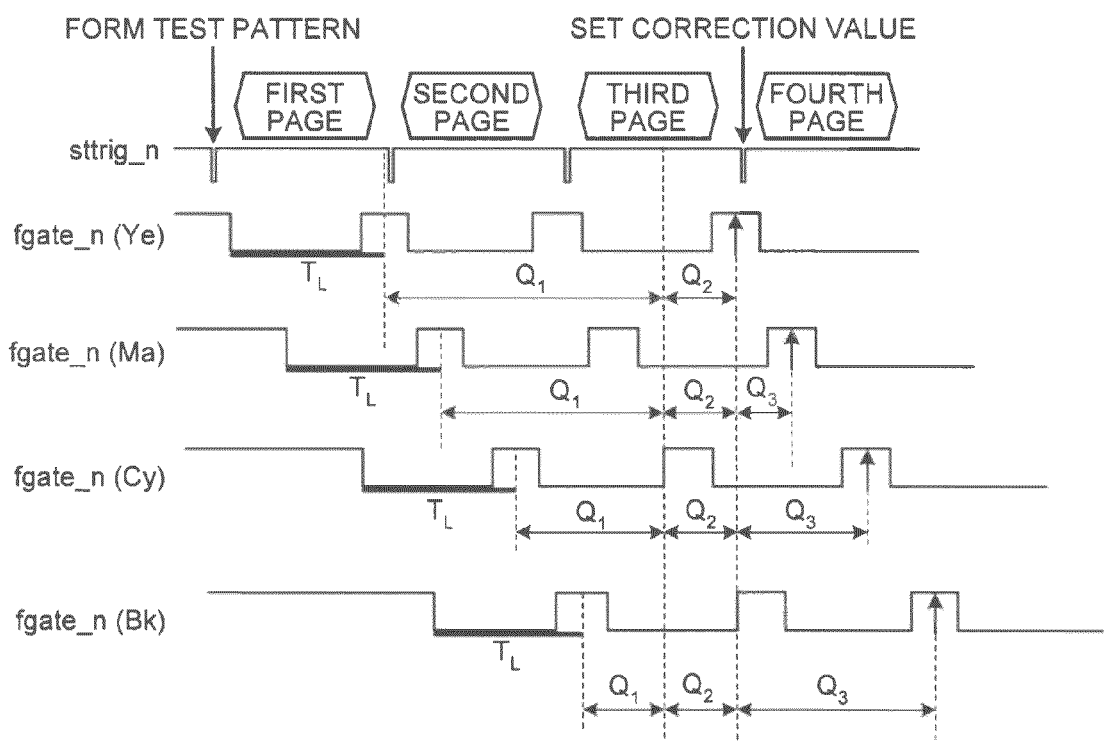
FIG. 8 is an example of a timing chart showing a time until the test pattern reaches the sensor after exposure and a time until a correction value based on the test pattern is reflected in image formation after the test pattern is detected.

FIG. 8 is an example of a timing chart showing the time from when the test pattern string 210 is exposed until the test pattern string 210 reaches the sensor 115 and a time from when the test pattern string 210 is detected until the correction value by the test pattern string 210 is reflected in image formation. In FIG. 8, the time Q in FIG. 6 is divided into the time $Q_1$ to $Q_3$.

As described above, with regard to the colors Ye, Ma, Cy, and Bk, the images of the respective colors of the test pattern 201 are formed in order of the colors Ye, Ma, Cy, and Bk in accordance with the positions of the photosensitive elements 104a, 106a, 108a, and 110a of the respective colors. The sensor 115 is at the same position regardless of the respective colors, so that the time $Q_1$ for each color decreases in order of the colors Ye, Ma, Cy, and Bk. Meanwhile, the calculation processing of the color misregistration correction value based on a result of detecting the test pattern string 210 is the same in the colors Ye, Ma, Cy, and Bk. Thus, the time $Q_2$ from when the test pattern string 210 is detected by the sensor 115 until the color misregistration correction value is calculated on the basis of the detection result is substantially the same for each color.

Therefore, in order that the correction value determined using the test pattern string 210 is reflected in the same page for all colors, the correction value determined using the test pattern string 210 that is calculated for each of the colors is stored in the RAM 11 or the like and the stored correction value of each color is set on the writing control unit 21 during an inter-sheet period immediately after image formation on a page immediately before a correction-target page ends to reflect the color misregistration correction value in image formation on the correction-target page, as implied by the $Q_3$ in FIG. 8.

Figure 9:
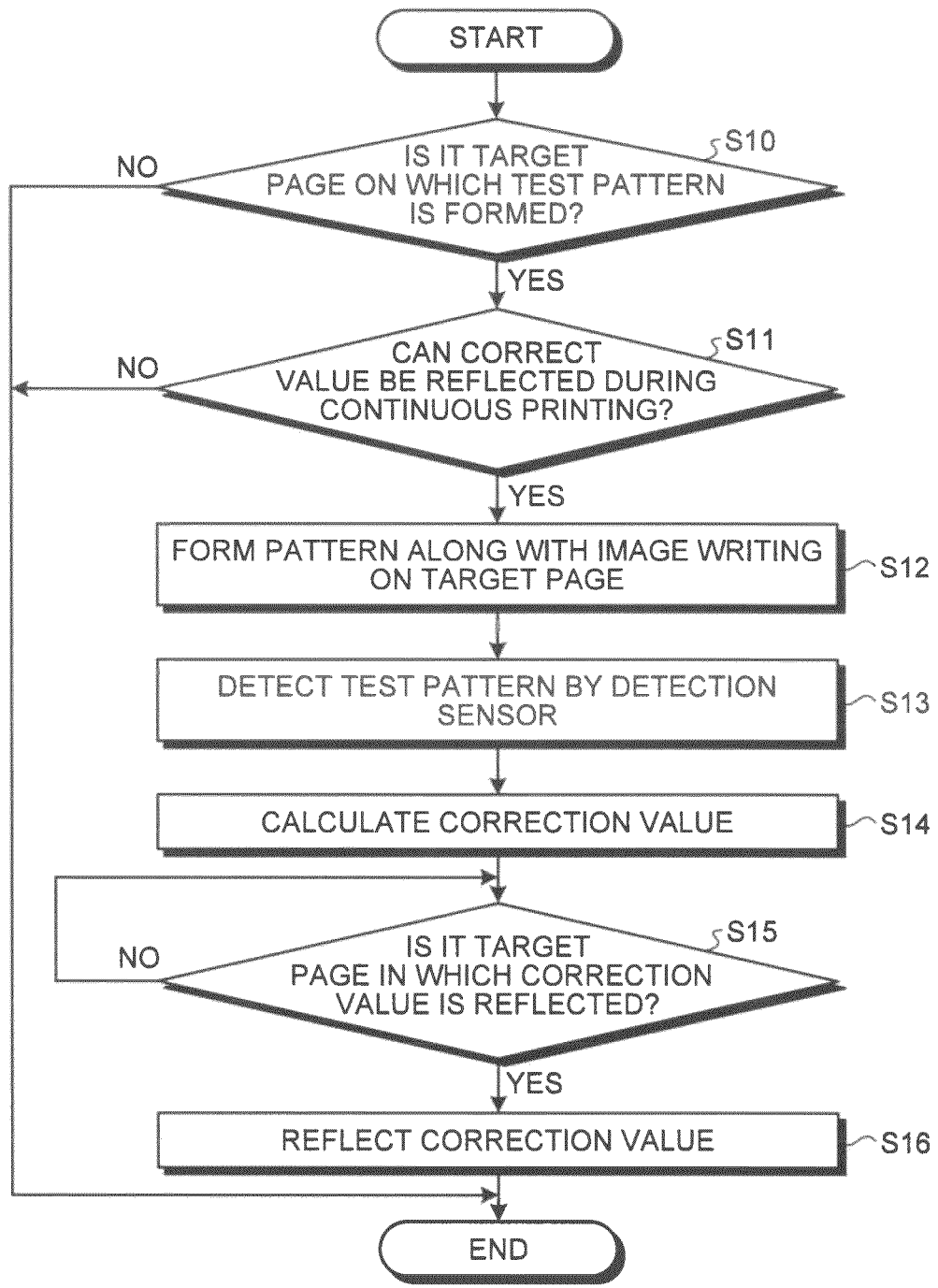
FIG. 9 is a flowchart showing an example of color misregistration correction processing using the test pattern for color misregistration correction according to an embodiment of the invention.

FIG. 9 is a flowchart showing an example of color misregistration correction processing using the test pattern string 210 for color misregistration correction according to this embodiment. The processing of the flowchart is controlled and performed by the CPU 10 in accordance with the program stored in the ROM 12.

Before the processing in the flowchart of FIG. 9, the length L of the test pattern string 210, that is, the time $T_L$ for which the test pattern string 210 is formed is determined. The time $T_L$ is set by, for example, a user's operation on the image forming apparatus 100. As an example, a table or relational expression which represents a relationship between precision of positional misregistration correction and the time $T_L$ is prepared in advance in the ROM 12 or the like, and if the precision of positional misregistration correction is set by a user's operation, the CPU 10 determines the time $T_L$ corresponding to the set precision from the table or relational expression. The CPU 10 calculates the minimum time P using the expression (1) on the basis of the determined time $T_L$.

The invention is not limited thereto, and before the processing in the flowchart of FIG. 9, the time P from the timing of starting to write an image of a page at which the test pattern string 210 is formed to the timing of starting to write an image in which the correction value determined using the test pattern string 210 is reflected may be determined. It is conceivable that the time P is set on the basis of, for example, a number of sheets to be printed and a printing image size (A4, B4, or the like) in a printing job. That is, when the number of sheets to be printed is small, the time P is set such that the color misregistration correction value is reflected in pages, a number of which is equal to or greater than a product of a predetermined ratio and the number of sheets to be printed. The time P may be specified by a user's operation. The CPU 10 calculates the maximum time $T_L$ on the basis of the set time P and using the expression (1).

In the flowchart of FIG. 9, first, a printing job which gives an instruction to execute printing is supplied, for example, from a higher-level system to the image forming apparatus 100, and delivered to the controller 20 and the CPU 10. The controller 20 performs setting of the writing control unit 21 on the basis of information, such as a number of sheets to be printed or a printing image size in the printing job. Thus, a printing operation of each page according to the printing job is carried out. The processing in the flowchart is performed in parallel with the printing operation.

If the printing job is supplied, in Step S10, the CPU 10 determines whether or not a page as a current printing target is the target page at which the test pattern string 210 should be formed. If it is determined that the printing-target page is not the target page at which the test pattern string 210 should be formed, a sequence of processing in the flowchart ends, and printing according to the printing job is carried out.

Determination in Step S10 will be described in more detail. The CPU 10 acquires information on a state relating to execution determination of color misregistration correction, for example, at a timing of the signal sttrig_n. The CPU 10 determines whether or not the state indicated by the acquired information satisfies an execution condition of the color misregistration correction, and when it is determined that the execution condition is satisfied, determines that the printing-target page is the target page at which the test pattern string 210 should be formed. When it is determined that the state indicated by the acquired information does not satisfy the execution condition of the color misregistration correction, it is determined that the printing-target page is not the target page at which the test pattern string 210 is formed. In this case, the CPU 10 ends a sequence of processing in the flowchart of FIG. 9, carries out printing on the printing-target page, and waits for the next signal sttrig_n.

The execution condition of the color misregistration correction will be described in more specifically. In this embodiment, the color misregistration correction using the test pattern string 210 is carried out in accordance with, for example, changes in a printing environment of the image forming apparatus 100. As the printing environment, change of which may cause color misregistration during printing, (1) temperature, (2) a number of printed sheets, and the like are conceivable. When an amount of change in the printing environment satisfies a condition set in advance, the CPU 10 forms the test pattern string 210 and performs the color misregistration correction processing.

The temperature in the abovementioned item (1) refers to, for example, an internal temperature of the image forming apparatus 100. The invention is not limited thereto, and an ambient temperature of the image forming apparatus 100 may be used. As an example, a temperature measurement unit is provided inside the image forming apparatus 100, and at a time when the color misregistration correction using the test pattern string 210 is performed, the CPU 10 measures the internal temperature of the image forming apparatus 100 by the temperature measurement unit. A result of measuring the internal temperature is stored in, for example, a rewritable nonvolatile memory (not shown) connected to a data bus. The CPU 10 measures the internal temperature by the temperature measurement unit, for example, at a timing of the signal sttrig_n, compares the measured internal temperature with the result of measuring the internal temperature at a time of the previous color misregistration correction stored in the memory or the like, and when the difference between the both exceeds a threshold value (for example, 5° C.) set in advance, determines that the execution condition of the color misregistration correction is satisfied.

The number of printed sheet in the abovementioned item (2) will be explained. As an example, a counter which counts the number of printed sheets is provided in the image forming apparatus 100, and if the color misregistration correction using the test pattern string 210 is carried out, the CPU 10 resets a count value of the counter and starts to count the number of printed sheets by the counter. The count value of the number of printed sheets is stored in, for example, a rewritable nonvolatile memory (not shown) connected to a data bus. When the count value of the number of printed sheets exceeds a threshold value (for example, 10 sheets) set in advance, the CPU 10 determines that the execution condition of the color misregistration correction is satisfied.

The execution condition of the color misregistration correction is not limited to (1) the temperature and (2) the number of printed sheets described above. For example, an elapsed time after the previous color misregistration correction is carried out may be used as the condition, or toner consumption of each color may be used as the condition. A user's operation which gives an instruction to execute the color misregistration correction is conceivable to be used as the condition.

Returning to FIG. 9, in Step S10, if it is determined that the page as the current printing target is the target page at which the test pattern string 210 should be formed, the processing proceeds to next Step S11. In Step S11, the CPU 10 determines whether or not the calculated color misregistration correction value can be reflected during sequential printing by the current printing job, if the test pattern string 210 will be formed at the page that is the current printing target and the color misregistration correction value will be calculated. Determination in Step S11 is made on the basis of information, such as the length of the page, which is a printing target by the printing job, in the sub scanning direction, or a time from when the test pattern string 210 is formed until the correction value calculated by detecting the test pattern string 210 is reflected in a page that is a printing target.

Specifically, referring to the expression (1) and FIG. 6, when the total time (the time Q of FIG. 6) of the time $Q_1$ for which the test pattern string 210 is conveyed from the exposure position of the test pattern string 210 to the sensor 115 and the time $Q_2$ from when the test pattern string 210 is detected by the sensor 115 until the correction value based on the detection result is reflected in image formation by performing setting of the writing control unit 21 is larger than the time (the time P of FIG. 6) from the timing of starting to form the test pattern string 210 to the timing of starting to write an image in which the color misregistration correction value calculated on the basis of the test pattern string 210 should be reflected, the test pattern string 210 is not formed. That is, this is because, in this case, the color misregistration correction value calculated on the basis of the formed test pattern string 210 cannot be reflected in the target page.

Referring to the expression (1), the above situation indicates that a condition P−Q≧0 is not satisfied, and in this case, the test pattern string 210 is not formed. Thus, in order that it is determined in Step S11 that the color misregistration correction value can be reflected during sequential printing, it is necessary that at least the condition P−Q≧0 is satisfied. Actually, a state P−Q=0, that is, P=Q means a state where the test pattern string 210 is not formed. For this reason, by considering a case in which only one test pattern 201 having a length $L_1$ and requiring a time $T_{L1}$ for forming it is formed, it is conceivable that a condition in that at least P−Q≧$T_{L1}$ is satisfied is used as a minimum condition. Actually, from the viewpoint of the specifications of the image forming apparatus 100, a lower limit value of the length L of the test pattern string 210 is determined such that the color misregistration correction value can be calculated with predetermined precision or more.

In order to carry out color misregistration correction with better precision, it is necessary to calculate the color misregistration correction value using a larger number of test patterns 201. For example, a number of test patterns 201 is set such that necessary precision can be achieved, and the length L and the forming time $T_L$ of the test pattern string 210 having the set number of test patterns 201 are determined. In Step S11, referring to the expression (1), when P−Q≧$T_L$, is satisfied, it is determined that the color misregistration correction value can be reflected during sequential printing. Thus, it becomes possible to carry out color misregistration correction while achieving necessary precision.

In Step S11, as an example where the color misregistration correction value cannot be reflected during sequential printing by the current printing job, there is a case where settings of the time P or the time $T_L$ is not appropriate. As another example, when the number of pages to be sequentially printed is too small and thus, for example, there is no printing-target page at an end of the time P, it is determined that the color misregistration correction value cannot be reflected during sequential printing by the current printing job. It is conceivable to determine that the color misregistration correction value cannot be reflected during sequential printing by the current printing job, if a number of pages to be printed subsequently to a page in which the color misregistration correction value is reflected is equal to or smaller than a predetermined number, even when the expression (1) is satisfied.

Returning to FIG. 9, if it is determined in Step S11 that the correction value cannot be reflected during sequential printing, the CPU 10 ends a sequence of processing in the flowchart of FIG. 9, carries out printing on the present printing-target page, and waits for the next signal sttrig_n.

Meanwhile, if it is determined in Step S11 that the correction value can be reflected during sequential printing, the processing proceeds to Step S12. In Step S12, the CPU 10 carries out image writing of the printing-target page on the intermediate transfer belt 114, and forms the test pattern string 210 on the intermediate transfer belt 114 in parallel with the image writing. The processing in Step S12 is performed for the colors Ye, Ma, Cy, and Bk.

When the test pattern string 210 formed on the intermediate transfer belt 114 is detected by the sensors 115a and 115c (Step S13), the processing proceeds to Step S14. In Step S14, the CPU 10 calculates the color misregistration correction value on the basis of results of detecting the test pattern string 210 by the sensors 115a and 115c in the same manner as described with reference to FIGS. 3 and 4. If the color misregistration correction value is calculated, the processing proceeds to Step S15.

In Step S15, it is determined for each of the colors Ye, Ma, Cy, and Bk whether or not a current printing-target page is a page in which the color misregistration correction value calculated in Step S14 should be reflected. That is, as described with reference to FIGS. 7 and 8, the exposure positions of the colors Ye, Ma, Cy, and Bk are different from each other depending on the positions of the photosensitive elements 104a, 106a, 108a, and 110a. For this reason, with regard to the color Bk having exposure position closest to the sensor 115 (that is, most distant in the driving direction of the intermediate transfer belt 114), the waiting time until the color misregistration correction value is reflected after calculated is largest. Meanwhile, with regard to the color Ye having the exposure position most distant from the sensor 115 (that is, nearest in the driving direction of the intermediate transfer belt 114), the waiting time is substantially set to 0.

If it is determined that a current printing-target page is not a page in which the color misregistration correction value should be reflected, the processing returns to Step S15, and it waits for a page in which the color misregistration correction value should be reflected. Meanwhile, when it is determined that a current printing-target page is a page in which the color misregistration correction value should be reflected, the processing proceeds to Step S16, and the CPU 10 reflects the color misregistration correction value of each color calculated in Step S14 in image writing on the page to be reflected. A sequence of processing in the flowchart of FIG. 9 ends, and it waits for the next signal sttrig_n.

In Step S11, when an end of the time Q, that is, the timing of starting to write an image in which the color misregistration correction value is reflected is during a period in which a page image is written, if the color misregistration correction value is reflected in the image writing without a countermeasure, a printing condition may change in the middle of the page. For this reason, in this case, the timing of reflecting the color misregistration correction value is delayed such that the timing is set to be in the inter-sheet period immediately after the current page image. At this time, it is advantageous to increase the time $T_L$ for which the test pattern string 210 is formed in order to delay the timing of reflecting the color misregistration correction, because the precision of correction by the color misregistration correction value is thereby improved.

The CPU 10 may determine, on the basis of information indicating a printing image size in the printing job, whether or not the timing of reflecting the color misregistration correction value is during the period in which a page image is written.

Although in the above description, when it is determined in Step S11 that the color misregistration correction value cannot be reflected during sequential printing, a sequence of processing in the flowchart of FIG. 9 ends, and printing is carried out on the printing-target page, the invention is not limited thereto. For example, the time $T_L$ or the time P may be changed such that the color misregistration correction value can be reflected, and the processing may proceed to Step S12.

As an example, when the time P is fixed, the CPU 10 changes the time $T_L$ to a maximum value in a range where the expression (1) is satisfied. As another example, when the time $T_L$ is fixed, on the basis of the following expression (2) which is obtained by modifying the expression (1), the CPU 10 changes the time P to a minimum value in a range where the expression (2) is satisfied.

$$P \geq T_L + Q \quad (2)$$

In carrying out color misregistration correction on the basis of a result of detecting the formed test pattern string 210 by the sensor 115, a first image forming color (in the example of FIG. 1, the color Ye) which is first transferred to the intermediate transfer belt 114 can be used as a criterion for correction. Thus, it should suffice that the color misregistration correction value is reflected in only second to fourth image forming colors (in the example of FIG. 1, the colors Ma, Cy, and Bk), making it possible to reduce a time (the time $Q_3$ of FIG. 8) necessary for reflecting the color misregistration correction value. Therefore, it becomes possible to increase the time $T_L$, for which the test pattern string 210 is formed, by the reduced time, thereby improving the precision of color misregistration correction.

In carrying out color misregistration correction, a laser light source used to perform image writing and a laser light source used to form the test pattern string 210 may be separately provided. With this, the laser light source used to perform image writing is further used to form the test pattern string 210 other than to perform the image writing, thereby extending the lifetime of the laser light source used to perform the image writing.

As described above, according to this embodiment, the determination on whether or not the color misregistration correction value calculated based on the result of detecting the test pattern string 210 can be reflected in the target page is made on the basis of the time P from the timing of starting to form the test pattern string 210 to the timing of starting to write an image in which the correction value calculated on the basis of the test pattern string 210 is reflected, and the total time (the time Q of FIG. 6) of the time $Q_1$ for which the test pattern string 210 is conveyed from the exposure position of the test pattern string 210 to the sensor 115 and the time $Q_2$ from when the test pattern string 210 is detected by the sensor 115 until the correction value determined based on the result of detecting is reflected in image formation by performing setting of the writing control unit 21.

For this reason, it can be ensured that the color misregistration correction value determined using the test pattern string 210 is reflected in the target page, and it is possible to prevent occurrence of the problem in that the correction value determined using the test pattern string 210 cannot be reflected in the target page, and the color misregistration correction value is reflected in, for example, a page next to the target page. Further, it is possible to prevent occurrence of a wasteful waiting time until the color misregistration correction value is reflected.

According to the embodiment of the invention, it is possible to more efficiently carry out image quality adjustment by a test pattern formed in parallel with image formation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a plurality of first image carriers;
   a toner image forming unit which exposes the plurality of first image carriers to form latent images and develops the latent images on the plurality of first image carriers with toner of different colors to form images of the respective colors;
   a second image carrier which is driven at a predetermined speed and to which the image of each of the colors formed on one of the plurality of first image carriers by the toner image forming unit is transferred in an aligned and overlapped manner;

an image forming unit which transfers the images of the respective colors, which has been transferred on the second image carrier in an overlap manner, to a transfer material to carry out image formation;

a test pattern generation unit which generates a test pattern string which includes one or a plurality of test pattern images and which is formed by the plurality of first image carriers and transferred to the second image carrier;

a detection unit which detects the test pattern string transferred to the second image carrier by a sensor; and a correction value calculation unit which calculates a correction value used to correct an image formation condition in the toner image forming unit on the basis of a result of detecting the test pattern string by the detection unit, wherein the test pattern generation unit generates the test pattern string such that a first length of the test pattern string in a sub scanning direction is equal to or smaller than a second length which is obtained by multiplying the speed, at which the second image carrier is driven, by a time obtained by subtracting a total time of a time for which the test pattern string is conveyed from a position, at which the plurality of first image carriers is exposed, to the sensor by the second image carrier and a time from when the test pattern string is detected by the detection unit until the correction value calculated by the correction value calculation unit is reflected in the image formation by the toner image forming unit from a time from a timing of starting to write the test pattern string to the first image carriers to a timing of starting to write an image in which the correction value should be reflected.

2. The image forming apparatus according to claim 1, further comprising:

a detection unit which detects a change in an environment, wherein the test pattern generation unit generates the test pattern string when an amount of change in the environment detected by the detection unit satisfies a condition set in advance.

3. The image forming apparatus according to claim 2, wherein the environment is an ambient temperature, and the detection unit which detects the change in the environment is an ambient temperature detection unit which detects the ambient temperature, and the test pattern generation unit generates the test pattern string when a difference between the ambient temperature detected by the ambient temperature detection unit and the ambient temperature at a time when the test pattern string has been previously generated is equal to or greater than a predetermined value.

4. The image forming apparatus according to claim 2, wherein the environment is a number of times of the image formation on the transfer material, and the detection unit which detects the change in the environment is a counter which counts the number of times, and the test pattern generation unit generates the test pattern string when the number of times counted by the counter from a time when the test pattern string has been previously generated is equal to or greater than a predetermined value.

5. The image forming apparatus according to claim 1, wherein the test pattern generation unit generates only a type of the test pattern string which is used by the correction value calculation unit to calculate the correction value.

6. The image forming apparatus according to claim 1, wherein the sensor is arranged near the second image carrier and downstream of the plurality of first image carriers in a driving direction of the second image carrier.

7. The image forming apparatus according to claim 1, wherein the correction value calculation unit uses, as a criterion, an image of one of the colors that is firstly transferred to the second image carrier from among the images of the colors formed by the plurality of first image carriers in the test pattern images, and calculates the correction values for images of ones of the colors other than the one of the colors.

8. The image forming apparatus according to claim 1, wherein the test pattern generation unit sets the first length to a multiple of a length of a single test pattern image.

9. The image forming apparatus according to claim 1, wherein the test pattern generation unit sets a minimum value of the first length to a length of a single test pattern image.

10. The image forming apparatus according to claim 1, wherein, when a number of the transfer materials successively subjected to the image formation is equal to or smaller than a predetermined number, the test pattern generation unit does not generate the test pattern string.

11. The image forming apparatus according to claim 1, wherein the first image carriers are exposed using different light sources between when the first image carriers are exposed for the image formation and when the exposure the first image carriers is exposed in order to form the test pattern string.

12. A method of controlling an image forming apparatus, the method comprising:

a toner image forming step in which a toner image forming unit exposes a plurality of first image carriers to form latent images and develops the latent images on the plurality of first image carriers with toner of different colors to form images of the respective colors;

an image forming step in which an image forming unit transfers the images of the respective colors transferred to a second image carrier, which is driven at a predetermined speed and to which the images of the respective colors formed on the plurality of first image carriers are transferred in an aligned and overlapped manner in the toner image forming step, in an overlapped manner to a transfer material to carry out image formation;

a test pattern generation step in which a test pattern generation unit generates a test pattern string including one or a plurality of test pattern images, which is formed by the plurality of first image carriers and transferred to the second image carrier;

a detection step in which a detection unit detects the test pattern string transferred to the second image carrier by a sensor; and a correction value calculation step in which a correction value calculation unit calculates a correction value used to correct an image forming condition in the toner image forming step on the basis of a result of detecting the test pattern string in the detection step, wherein, in the test pattern generating step, the test pattern string is generated such that a first length of the test pattern string in a sub scanning direction is equal to or smaller than a second length which is obtained by multiplying the speed, at which the second image carrier is driven, by a time obtained by subtracting a total time of a time for which the test pattern string is conveyed from a position, at which the plurality of first image carriers is exposed, to the sensor by the second image carrier and a time from when the test pattern string is detected in the detection step until the correction value calculated in the correction value calculation step is reflected in the image formation in the toner image forming step from a time from a timing of starting to write the test pattern string to the first image carriers to a timing of starting to write an image in which the correction value should be reflected.

13. An image forming apparatus comprising:

a plurality of first means for carrying an image;

a means for forming a toner image which exposes the plurality of first means for carrying the image to form latent images and develops the latent images on the plurality of first means for carrying the image with toner of different colors to form images of the respective colors;

a second means for carrying an image which is driven at a predetermined speed and to which the image of each of the colors formed on one of the plurality of first means for carrying the image by the means for forming the toner image is transferred in an aligned and overlapped manner;

a means for forming an image which transfers the images of the respective colors, which has been transferred on the second means for carrying the image in an overlap manner, to a transfer material to carry out image formation;

a means for generating a test pattern string which includes one or a plurality of test pattern images and which is formed by the plurality of first means for carrying the image and transferred to the second means for carrying the image;

a means for detecting the test pattern string transferred to the second means for carrying the image by a sensor; and a means for calculating a correction value used to correct an image formation condition in the means for forming the toner image on the basis of a result of detecting the test pattern string by the means for detecting, wherein the means for generating the test pattern generates the test pattern string such that a first length of the test pattern string in a sub scanning direction is equal to or smaller than a second length which is obtained by multiplying the speed, at which the second means for carrying the image is driven, by a time obtained by subtracting a total time of a time for which the test pattern string is conveyed from a position, at which the plurality of first means for carrying the image is exposed, to the sensor by the second means for carrying the image and a time from when the test pattern string is detected by the means for detecting until the correction value calculated by the means for calculating the correction value is reflected in the image formation by the means for forming the toner image from a time from a timing of starting to write the test pattern string to the first means for carrying the image to a timing of starting to write an image in which the correction value should be reflected.

\* \* \* \* \*